United States Patent Office 3,580,925
Patented May 25, 1971

3,580,925
IMIDAZOLE PREPARATION
Philip Manos, Wilmington, Del., assignor to E. I. du Pont de Nemours and Company, Wilmington, Del.
No Drawing. Original application May 23, 1966, Ser. No. 551,872. Divided and this application Dec. 26, 1968, Ser. No. 787,248
Int. Cl. C07d 49/00
U.S. Cl. 260—309
3 Claims

ABSTRACT OF THE DISCLOSURE

The preparation of benzils from benzoins by reacting the benzoin with a cupric carboxylate catalyst in the presence of a solvent of acetic acid or a water-miscible alcohol at a temperature of 20° to 130° C. while passing oxygen into the reaction mixture. The preparation of imidazoles from benzils by adding, to the reaction mixture in the preceding sentence, ammonia or a weak acid salt thereof and a benzaldehyde.

CROSS REFERENCE TO RELATED APPLICATION

This application is a divisional of application Ser. No. 551,872, filed May 23, 1966, now abandoned.

DESCRIPTION OF THE INVENTION

This invention relates to a novel catalytic method for preparing imidazoles starting from an α-hydroxy carbonyl benzoin.

Benzil and substituted benzils, widely useful as photo-oxidants, and intermediates, are generally prepared from the corresponding benzoins. The disclosed oxidation methods however are not entirely suitable for commercial use. For example nitric acid [Adams and Marvel, Organic Sythesis I, 25 (1921)], the halogens (Corson and McAllister, J.A.C.S. 51 2822 (1929)], and catalytic copper oxide at high temperatures [Zelzche and Zala, Helv. Chim. Acta 9 288 (1926)] either do not give satisfactory yields or pure products, or cannot be applied broadly to various substituted benzoins. Cupric salt use in pyridine [Clarke and Dreger, Organic Syntheses Coll. vol. I, 87 (1947)] has enjoyed wide utility, but requires stoichiometric copper quantities and expensive solvent that must be recovered and reprocessed. The Clarke et al. reference additionally discloses that spent $CuSO_4$/pyridine can be regenerated for reuse by passing air through it for 36 hours (15 hours not being long enough) and that air, in pyridine in the presence and absence of copper, is known to oxidize benzil to benzoic acid.

Weiss and Appel, J.A.C.S. 70 3666 (1948) have described a catalytic oxidation method involving $Cu^{II}$ in small proportion and excess ammonium nitrate to regenerate the $Cu^{II}$ oxidant. A serious drawback however is that ammonium nitrate is a hazardous explosive.

It is, therefore, an object of this invention to provide an improved catalytic process for oxidizing benzoins to benzils which is applicable to a variety of substituted benzoins and obviates many of the disadvantages inherent in the prior methods. A further object is to provide such a process which enables one to utilize the benzils directly in further reactions without having to first isolate them. Another object is to provide a process for producing imidazoles directly from benzoins by catalytically oxidizing benzoins to the intermediate benzils and concurrently effecting the imidazole condensation in the same reaction mixture.

These and other objects of the invention will become apparent from the following deescription and claims.

More specifically, the present invention is directed to a catalytic process for making benzils and imidazole derivatives thereof which comprises:
(I) forming a reaction mixture consisting essentially of
 (A) a benzoin which
  (1) contains a —CHOHCO— grouping that can reduce cupric copper to lower valent copper and
  (2) contains no substituent other than said —CHOHCO— group reactive to cupric copper or to $O_2$ under the process conditions described below
 (B) a $Cu^{II}$ oxidant for the benzoin in a small catalytic proportion based on the benzoin and
 (C) a solvent for said $Cu^{II}$ oxidant and benzoin which
  (1) shows a pKa between 5 and 8 and
  (2) is inert to said $Cu^{II}$ compound and to molecular oxygen under the process conditions described below said reaction mixture being further characterized such that
   (i) components B and C together (in the absence of said benzoin) exhibit a characteristic blue-green $Cu^{II}$ color and
   (ii) adding the benzoin to B and C discharges the $Cu^{II}$ color at temperatures in the 20 to 130° C. range;
 (D) ammonia or a weak acid salt thereof and
 (E) an aldehyde inert to the $Cu^{II}$ compound/oxygen system under the process conditions and wherein said ammonia and aldehyde react in situ with the dicarbonyl oxidation product to produce an imidazole;
(II) heating at 20 to 130° C. and
(III) passing an oxygen-containing gas into the reaction mixture until the benzoin is substantially completely oxidized to the corresponding benzil.

A preferred embodiment is the heretofore described invention process wherein the oxygen-containing gas is passed into the reaction mixture until the $Cu^{II}$ characteristic color persists in the absence of added $O_2$. More specifically, this embodiment is directed to said process wherein:

(A) is benzoin or benzoin substituted with one or more groups having Hammett sigma values in the —.65 to .4 range,
(B) is a $Cu^{II}$ carboxylate,
(C) is acetic acid,
(D) is ammonium acetate
(E) is benzaldehyde or a benzaldehyde bearing one or more groups having Hammett sigma values in the —.65 to .4 range, and
benzoin to benzil oxidation and in situ triarylamidazole formation is effected at about 80–110° C.

This invention oxidation process is applicable to the preparation of a wide variety of benzils. The reactions are rapid and afford high-quality products in good yields. This is surprising in view of the Clarke and Dreger Organic Syntheses, Coll. vol. I, 87 (1942) disclosure which suggests that not only is the $Cu^{II}$ regeneration step uneconomically slow but that attempts to effect it in the oxidation reaction mass itself are doomed to result in low benzil yields.

The catalytic copper/air combination offers substantial savings over the prior copper-based oxidation systems in that it (1) requires much smaller amounts of costly copper, (2) utilizes a $Cu^{II}$ regenerator ($O_2$) that is cheap and relatively innocuous compared to the expensive and hazardous $NH_4NO_3$, (3) functions in a wide variety of solvents (so that the process can be readily tailored to the properties of the particular α-hydroxy carbonyl and dicarbonyl compounds involved) and is not dependent on the use of expensive, hard-to-recover pyridine.

Moreover, it has been discovered that the $Cu^{II}/O_2$ system's oxidative power can be varied by varying the reaction medium's acidity or basicity. Thus this system can be readily adapted to oxidize a variety of benzoins (presenting a range of reduction potentials) without at the same time oxidizing other materials which may be present in the reaction system.

THE BENZOIN, RCHOHCOR'

The term benzoin is used herein in the broad accepted sense to include R'CHOHCOR where R and R' stand not only for phenyl, but for higher carbocyclic aromatic radicals such as naphthyl, anthracenyl, phenanthryl, biphenyl, and terpenyl; also for heterocyclic aromatics such as thiophenyl, furfyl, pyridyl, quinolyl and the like. These radicals may contain non-interfering substituents, that is substituents that do not prevent the benzoin from reducing cupric copper to a lower valent state, do not prevent $O_2$ from regenerating the $Cu^{II}$ catalyst, and preferably do not react with oxygen under process conditions. Benzils containing substituents having a Hammett sigma value in the range —.65 to .4 represents a preferred class of compounds that may be prepared by the present invention from similarly substituted benzoins. The substituents include electrolpositive (electron-repelling) as well as electronegative (electronattracting) groups. The sigma values used herein are those listed by Jaffe, Chem. Rev., 53, 191 (1953), particularly at pages 219–233, including Table 7, the largest negative or positive value being taken on the basis that it represents the maximum electron-repelling or attracting effect of the substituent. Representative substituents and their sigma values (relative to H=0.00) are: methyl (—0.17), ethyl (—0.15), t-butyl (—0.20), phenyl (0.22), hydroxy (—0.36), butoxy (—0.32), phenoxy (—0.03); dimethylamino (—0.60), fluoro (0.34), chloro (0.37), bromo (0.39), iodo (0.35); methylthio (—0.05). Thus, the substituents may broadly be halogen, hydroxyl, alkyl, aryl, aralkyl, alkaryl, alkoxyl, aroxyl, aralkoxyl, alkaroxyl, alkyltho, arylthio, aralkylthio, alkarylthio, and dialkylamino. Preferably alkyl and alk stand for the $C_1$–$C_5$ radicals, and aryl and ar stand for aromatic hydrocarbon radicals, e.g. phenyl. These substituent groups are electronically compatible with the —CHOHCO— unit, that is, they do not interfere with the copper/oxygen oxidation system and are substantially inert to $O_2$ under process conditions.

Representative benzoins and their benzils include the following:

| R'CHOHCOR: | R'COCOR: |
|---|---|
| benzoin | benzil |
| 2'-chlorobenzoin | 2-chlorobenzil |
| 4-chlorobenzoin | 4-chlorobenzil |
| 2,2'-dichlorobenzoin | 2,2'-dichlorobenzil |
| 3,3'-dibromobenzoin | 3,3'-dibromobenzil |
| 4,4'-diiodobenzoin | 4,4'-diiodobenzil |
| 4-fluorobenzoin | 4-fluorobenzil |
| 2'-methylbenzoin | 2-methylbenzil |
| 3-ethylbenzoin | 3-ethylbenzil |
| 4'-t-butylbenzoin | 4-t-butylbenzil |
| 4-isopropylbenzoin | 4-isopropylbenzil |
| 4,4'-diisopropylbenzoin | 4,4-diisopropylbenzil |
| 2,2'-dimethylbenzoin | 2,2'-dimethylbenzil |
| 2,4,6-trimethylbenzoin | 2,4,6-trimethylbenzil |
| 2-methoxybenzoin | 2-methoxybenzil |
| 4'-methoxybenzoin | 4-methoxybenzil |
| 4-butoxybenzoin | 4-butoxybenzil |
| 2,2'-dimethoxybenzoin | 2,2'-dimethoxybenzil |
| 3,4-dimethoxybenzoin | 3,4-dimethoxybenzil |
| 4,4'-dimethoxybenzoin | 4,4'-dimethoxybenzil |
| 3'-chloro-4'-methoxybenzoin | 3-chloro-4'-methoxybenzil |
| 4-benzylthiobenzoin | 4-benzylthiobenzil |
| 4,4'-dibenzylthiobenzoin | 4,4'-dibenzylthiobenzil |
| 4'-benzylthio-4'-methoxybenzoin | 4-benzylthio-4'-methoxybenzil |
| 4'-dimethylaminobenzoin | 4-dimethylaminobenzil |
| 4-dimethylaminobenzoin | furil |
| furoin | benzfuril |
| benzfuroin | 2-pyridil |
| 2-pyridoin | 2-quinaldil |
| 2-quinaldoin | naphthabenzil |
| naphthabenzoin | α-naphthil |
| α-naphthoin | β-naphthil |
| β-naphthoin | 9,9'-phenanthril |
| 9,9'-phenanthroin | 4'-dimethylaminobenzfuril |
| 4-'dimethylaminobenzfuroin | furil |

THE COPPER/OXYGEN CATALYST SYSTEM

The copper component may be any cupric copper compound providing $Cu^{II}$ ions in the reaction medium, but normally will be a dissociable $Cu^{II}$ salt of an acid having a pKa in water of six or less. Representative examples of salts of strong and weak, organic and inorganic acids are $CuF_2$, $CuCl_2$, $CuBr_2$, $CuI_2$, $Cu(NO_3)_2$, $CuSO_4$, $CuCO_3$, $Cu^{II}$ acetate and homologs (including mixed acids such as the tallates and naphthenates), benzoates, and homologs, organic sulfonates such as methanesulfonate and homologs, and benzene sulfonate and homologs.

The copper compound may be added as such or as a complex with water, alcohol, such as methanol or ethanol, or nitrogen bases, such as ammonia, alkyl amine, alkylene diamine, and pyridine, such hydrates, alcoholates and amidates being well known.

The $Cu^{II}$ compound is normally used in amounts ranging from .01 to .2 mole per mole —CHOHCO— compound, more usually .02 to .1 per mole. Lower proportions, though sometimes useful, do not always give the desired rapid reaction, while larger quantities, though operable, are normally not needed.

The oxygen component may be $O_2$ gas itself, or any $O_2$-containing gas wherein the carrier gas is substantially inert to the rest of the system, for example, air.

The role of copper:

(1a) $RCHOHCOR' + Co^{+2} \rightarrow RCOCOR' + 2H^+ + Cu^°$ (1b) $RHOHCOR' + 2Cu^{+2} \rightarrow RCOCOR + 2H^+ + 2Cu^+$ The role of oxygen:

(2a) $2Cu^° + O_2 + 4H^+ \rightarrow 2Cu^{+2} + 2H_2O$ (2b) $4Cu^+ + O_2 + 4H^+ \rightarrow 4Cu^{+2} + 2H_2O$ It will be noted that the lower valent copper may be cuprous or free copper. This depends on environmental factors such as the solvent and the particular

—CHOHCO— compound employed. Oxygen serves simply to regenerate the $Cu^{II}$ oxidant.

Ordinarily, of course, according to this invention, the oxidation of RCHOHCOR' by $Cu^{II}$ will spontaneously proceed to the right at process temperatures. Since these reactions are thermodynamically reversible, however, it will be appreciated that in some instances, the $ROCOCOR'/2H^+$ combination may be a stronger oxidant that the $Cu^{II}$ ion in the system employed depending on the constitution of the $Cu^{II}$ compound, the solvent medium, and the substituents R and R'.

In general, electron attracting R and R' groups (as measured by the Hammett sigma values) and also high hydrogen ion concentration (as indicated in Equations 1a and 1b) in crease the dicarbonyl oxidation potential relative to the $Cu^{II}$ potential. Conversely, electron donating R and R' groups and low $H^+$ ion activity favor the 1a and 1b reactions proceeding to the right.

Solvent

This may vary widely and is note critical except that (1) it should be inert to the reactants and should not interfere with the oxidation reaction, (2) it should provide medium conducive to the reaction such as by solubilizing the benzoin and the $Cu^{II}$ compound, and (3) it should not promote side reactions such as the conversion of the resulting dicarbonyl compounds to α-hydroxy carbonyl acids as is known to occur in hot aqueous alkali. It is usually desired too that solvents should not be either strongly acid or strongly basic; best results are obtained in reaction media having pKa greater than about 5 and less than about 8.

Suitable solvents include acetic acid and homologs especially those miscible with water, lower alcohols, ethers such as tetrahydrofuran, dioxane, diglyme, dimethylformamide, dimethyl acetamide, acetonitrile, and dimethyl sulfoxide.

The water miscible hydroxylic solvents particularly acetic acid and the alcohols are preferred as they facilitate product recovery.

The quantity of solvent is not critical, but usually amounts to from 1 to 30 parts per part by weight of the α-hydroxy carbonyl compound, usually from 5 to 15 parts per part.

As indicated above, the solvent may influence the relative oxidation potentials of the $Cu^{II}$ compound and the desired 1,2-dicarbonyl compound and in some cases the oxidation potential of the dicarbonyl compound will exceed that of $Cu^{II}$ compound and no oxidation will occur. This shows that not only is the $Cu^{II}$ compound essential for the oxidation, but that its environment must also be considered in carrying out any particular oxidation. Relatively basic solvents, such as dimethyl formamide, pyridine and other nitrogen bases, and coadditives, such as acid binding agents exemplified by the above basic solvents and alkali and alkaline earth metal hydroxides, carbonates, borates, phosphates, and carboxylates, are often beneficial to facilitate the desired oxidation reaction by suppressing the hydrogen ion concentration and at the same time enhancing the oxidation potential of the $Cu^{II}$ ion. Acid binding agent when needed will normally be added according to the stoichiometry of Equations 1a and 1b, usually about .5–2 equivalents per hydrogen ion liberated. Thus though strongly basic media are generally avoided (to avoid presence of large excesses of strong alkali, which cause side reactions) strong bases such as the alkali metal hydroxides and carbonates are sometimes advantageous when used in the smaller copper catalyst amounts.

The test to determine need for a basic solvent or an acid binding agent is whether or not the benzoin alone in the absence of added oxygen discharges the characteristic greenish-blue $Cu^{II}$ color in the reaction mixture.

Process conditions

The reactants may be combined in any order, but usually the $Cu^{II}$ compound and the benzoin are added to the solvent under agitation and with added heat as needed to solubilize at least part of these reactants. If the $Cu^{II}$ color still persists in the presence of excess benzoin at the contemplated reaction temperatures a small amount of an acid binding agent as described above is incorporated into the reaction mixture or a more basic solvent is employed to enable the oxidation to proceed. Molecular oxygen, as pure oxygen or more conveniently as air, is then passed into the system under conditions providing intimate contact between the gas and the liquid and/or solid phases. A variety of devices and techniques known to the art for effecting a gas-liquid contact may be used, including counter-current flow under continuous process conditions in columns and towers. It is sometimes desirable to flow the benzoin-containing reaction mixture down through a $Cu^{II}$ catalyst bed while passing the oxygen containing gas up through the bed.

The reaction temperature may vary widely depending on the reactants and the solvent system employed, but usually ranges from about room temperature to about 130° C., usually 50 to 110° C. The system pressure, while normally atmospheric, may also vary widely depending on the nature of the system.

Reaction time varies from a few minutes to an hour or so depending on the $Cu^{II}$ compound, the benzoin, the solvent, and the temperature. As stated above, an important feature of this invention is its built-in property of indicating the end of the reaction in the absence of added oxygen. As long as benzoin remains, no characteristic $Cu^{II}$ color will be observed. Persistence of the characteristic $Cu^{II}$ color signals the end point.

Another feature of this invention is that the starting benzoin can often be used in the form of the reaction mass resulting from its preparation, as described for example in chapter 5 of Organic Reactions, vol. IV, edited by Roger Adams, John Wiley and Sons, Incorporated, benzoins can be prepared by potassium cyanide catalyzed condensation of aromatic aldehyde in alcoholic media, also useful in the present process. Addition of cupric compound simultaneously (which has no deleterious effect on the present process) produces cupric cyanide. When subsequent treatment with oxygen is ineffective to convert such cuprous cyanide to cupric copper in a particular reaction mass, an additional catalytic quantity of $Cu^{II}$ compound may be added in accordance with this invention, and the oxidation to the benzil and regeneration of cupric copper by oxygen may then be effected in the usual manner.

As stated above, an important feature of this process is that the benzil reaction mass may generally be used directly to convert 1,2-dicarbonyls to imidazoles by adding ammonia (or a source thereof, such as an ammonium salt of a weak acid) and an aldehyde. This important reaction can be represented as follows:

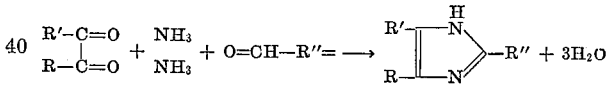

R″CHO may be any aldehyde that undergoes this known condensation, does not interfere with the $Cu^{II}$ oxidation reaction, and is not itself oxidized by said $Cu^{II}/O_2$ system under process conditions. In general, the aldehyde is used in equimolar amounts based on the starting benzoin while the ammonia component is added in excess, say 4–10 moles/mole benzoin. The solvent may be any of these mentioned above, preferably is water miscible, notably acetic acid and the alcohols. Conversion to imidazole is generally effected at elevated temperatures, such as 80–130° C. The imidazoles may be recovered by known methods.

R″ may be aliphatic or cycloaliphatic or more usually, aromatic and may contain substituents as defined above for R and R′. A preferred aldehyde class comprises aromatic aldehydes wherein aryl radical R″ may contain substituents having Hammett sigma values in the −.65 to .4 range, most preferably −.4 to .4.

These preferred aldehydes are preferably employed with the preferred similarly substituted benzoin class of —CHOHCO— compound to produce valuable triarylimidazoles, such as those described in copending applications of Cescon, Ser. No. 388,010 filed Aug. 6, 1964, now abandoned and Silversmith, U.S. Pat. 3,297,710, more particularly the Cescon reference discloses biimidazole compounds of the formula

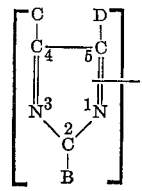

wherein B is represented by the formula

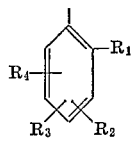

wherein $R_1$ is a substituent free from a hydrogen atom capable of reacting with methyl magnesium iodide and $R_2$, $R_3$ and $R_4$ are members selected from the group consisting of hydrogen and a substituent free from a hydrogen atom capable of reacting with methyl magnesium iodide, and where two of $R_1$, $R_2$, $R_3$ and $R_4$ in adjacent positions on the phenyl ring taken together may form a benzo ring, with the proviso that the substituent in a position ortho to the imidazolyl radical has a sigma constant below 0.7; and C and D are members selected from the group consisting of phenyl and phenyl substituted with up to three substituents free from a hydrogen atom capable of reacting with methyl magnesium iodide and where two of said substituents in adjacent position on the phenyl ring taken together may form a benzo ring, with the proviso that only one of said substituents when present on the same phenyl ring in the 4- and 5-positions can be in a position ortho to the imidazolyl radical. Members C and D can be alike or different.

That reference also discloses that the substituted triphenylimidazole which is an intermediate for the biimidazole can be prepared by three different methods and that the substituted triphenylimidazole in ethanol containing potassium hydroxide is then oxidized to a dimer of the imidazole compound by treatment with aqueous potassium ferricyanide. The desired product precipitates from the reaction mixture, is isolated by filtration and is washed free from ferricyanide with water. This procedure is described by Hayashi et al. in Bull. Chem. Soc., Japan, 33, 565 (1960). The products can be recrystallized from benzene, methanol, ethanol, cyclohexane, and the like. Difficulty may be encountered in the dimerization if the triphenylimidazole contains more than two substituents having sigma constants of 0.7 and above.

Representative examples further illustrating the invention follow.

EXAMPLE I

Cupric benzoate (.75 part by weight, .0025 mole) was added to benzoin (10.6 parts by weight, .05 mole) in methanol (100 parts by weight). Warming to 35–40° C. turned the mixture yellow, indicating complete $Cu^{II}$ reduction. Passing air through the mixture turned the solution green; when the air flow was stopped, the solution rapidly turned yellow again. Air was again blown through the mixture at a rate such that the solution maintained a greenish tint and the reaction mass temperature was 50–55° C. After one hour, the dark green solution was filtered, and methanol was boiled off to condense the filtrate to about 60% of its original volume. A small volume of water was added till the solution just remained cloudy. The solution was cooled to 0–10° C. and filtered to obtain crystalline benzil, M.P. 94.5–95° C., in 98% yield.

EXAMPLE II

.5 molar benzoin in 100 parts by weight acetic acid solutions containing .5 to one part by weight cupric acetate were sparged with excess air under conditions tabulated below. Reaction was considered complete ten minutes after the reaction mixture turned dark blue-green. Each mixture was filtered hot, cooled to 20–25° C. to crystallize the benzil, and filtered to recover the product.

TABLE I.—OXYGEN-ASSISTED $Cu^{II}$-CATALYZED BENZOIN TO BENZIL OXIDATION

| R'CHOHCOR | Parts by weight | Molar $Cu^{II}$/R'CHOHCOR | Reaction time, minutes at 100° C. | Benzil yield, percent |
|---|---|---|---|---|
| Benzoin | 10.6 | .1 | 30 | 90 |
| 4,4'-dimethoxybenzoin (Anisoin) | 13.5 | .05 | 50 | 100 |
| 2'-methylbenzoin | 10.7 | .05 | 60 | 95 |
| 2-methoxybenzoin | 12.0 | .05 | 45 | 96 |
| 4-methoxybenzoin | 12.0 | .1 | 30 | 90 |
| 4,4'-dimethylbenzoin | 12.0 | .1 | 40 | 85 |
| 4-dimethylaminobenzoin | 12.0 | .1 | 35 | 80 |
| 2,5-dimethoxybenzoin | 13.5 | .1 | 45 | 80 |
| 2'-chlorobenzoin | 12.5 | .1 | 65 | 70 |
| 4-chlorobenzoin | 12.5 | .05 | 75 | 68 |
| A-Naphthalbenzoin | 13.0 | .05 | 65 | 90 |
| 4,4'-dibenzyl thiobenzoin | 22.5 | .05 | 55 | 95 |
| 4-benzylthiobenzoin | 17.0 | .05 | 50 | 90 |
| 4-benzylthio-4'-methoxybenzoin | 18.2 | .05 | 65 | 92 |

EXAMPLE III

Following the procedure of Examples I and II, air was sparged through .25 molar anisoin solutions, involving various solvents and $Cu^{II}$ oxidants (.1 mole/mole anisoin) shown in Table II, for one hour at 80–100° C.

The acetic acid system was worked up as in Example II. The others were diluted with an equal volume of water and filtered. The crude product was recrystallized from acetic acid to give anisil in the tabulated yields.

TABLE II

[$O_2$-assisted $Cu^{II}$-catalyzed anisoin to anisil oxidation]

| $Cu^{II}$ compound | Solvent | Anisil yield, percent |
|---|---|---|
| $CuSO_4 \cdot 5H_2O$ | N,N-dimethylformamide (DMF) | 70 |
| $CuSO_4 \cdot 5H_2O$ | Pyridine | 80 |
| $CuCl_2 \cdot 2H_2O$ | do | 68 |
| $CuBr_2 \cdot 2H_2O$ | do | 60 |
| $Cu(NO_3)_2 \cdot 3H_2O$ | DMF | 69 |
| Same as above | Pyridine | 77 |
| $Cu^{II}$ benzoate | do | 70 |
| Same as above | Acetic acid | 80 |
| $Cu^{II}$ acetate | Absolute ethanol | 95 |
| Same as above | 95% EtOH plus 4 volume percent pyridine. | 80 |

The following examples illustrate the use of this invention for the direct one step preparation of imidazoles from α-hydroxycarbonyl compound, aldehyde, ammonia source and the $Cu^{II}/O_2$ oxidant system.

EXAMPLE IV

A mixture consisting essentially of:

| | Parts |
|---|---|
| 2,6-dimethyl-4-hydroxybenzaldehyde (.02 mole) | 3.0 |
| 4-dimethylaminobenzoin (.02 mole) | 5.1 |
| Acetic acid | 100 |
| Ammonium acetate (.17 mole) | 15 |
| $Cu^{II}$ acetate·$H_2O$ (.002 mole) | .4 | was heated to 100° C. under agitation and blown with air for two hours. The mixture was poured into 500 parts water, filtered, and the dried solid recrystallized from benzene-methanol to give 2-(4-hydroxy - 2,6 - dimethylphenyl) - 4 - (4- - dimethylaminophenyl)-5-phenylimidazole, M.P. 318–325° C., in 92% yield.

EXAMPLE V

The Example IV procedure was repeated with various benzoins and aldehydes as shown in Table IV to produce the corresponding triaryl imidazoles directly in high yields and purities.

The following representative examples may be varied within the scope of the present total specification disclosure, as understood and practiced by one skilled in the art, to achieve essentially the same results.

TABLE IV.—TRIARYLIMIDAZOLE PREPARATION

| RCHOHCOR' | R"CHO | Triarylimidazole |
|---|---|---|
| Benzoin | Benzaldehyde | 2,4,5-triphenyl. |
| Anisoin | 4-hydroxybenzaldehyde. | 2-((4-hydroxyphenyl)-4,5-bis-(4-methoxyphenyl). |
| 4,4'-dimethylbenzoin. | 4-hydroxy-3,5-di-t-butyl benz-aldehyde. | 2-(4jhydroxy-3,5-di-t-butyl phenyl)-4,5-bis(4-methylphenyl). |
| Benzoin | 2-chlorobenzaldehyde. | 2-(2-chlorophenyl)-4,5-bis-(phenyl). |
| 4-methoxy benzoin. | 4-hydroxy-3,5-di-t-butyl benzaldehyde. | 2-(4-hydroxy-3,5-di-t-butyl phenyl)-4-(4-methoxyphenyl)-5-phenyl. |
| 4-dimethylamino-benzoin. | 4-hydroxybenzaldehyde. | 2-(4-hydroxyphenyl)-4-(4-dimethylaminophenyl)-5-phenyl. |
| Anisoin | 4-dimethylaminobenzldehyde. | 2-(4-dimethylaminophenyl)-4,5-bis(4-methoxyphenyl). |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. Process for preparing imidazoles which comprises
   (I) forming a reaction mixture comprising
      (A) a benzoin having the structural formula R'CHOHCOR wherein R and R' each represent phenyl, naphthyl, anthracenyl, phenanthryl, biphenylyl, terphenylyl, or any of the foregoing groups substituted with halogen, hydroxyl, alkyl of 1–5 carbon atoms, phenyl, phenyl, substituted $C_1$–$C_5$ alkyl, $C_1$–$C_5$ alkyl substituted phenyl, $C_1$–$C_5$ alkoxy, phenoxyl, phenyl substituted $C_1$–$C_5$ alkoxyl, $C_1$–$C_5$ alkyl substituted phenoxyl, $C_1$–$C_5$ alkylthio, phenylthio, phenyl substituted $C_1$–$C_5$ alkylthio, $C_1$–$C_5$ alkyl substituted phenylthio or di-($C_1$–$C_5$)alkylamino;
      (B) a cupric carboxylate in a small catalytic portion based on said benzoin, which carboxylate is selected from acetate, benzoate, tallates or naphthenates,
      (C) a solvent for said carboxylate and said benzoin which solvent is selected from acetic acid and water-miscible alcohols;
      (D) ammonia or a weak acid salt of ammonia, and
      (E) benzaldehyde or a substituted benzaldehyde in which the substituents are selected from halogen, hydroxyl, alkyl of 1–5 carbon atoms, phenyl, phenyl substituted $C_1$–$C_5$ alkyl, $C_1$–$C_5$ alkyl substituted phenyl, $C_1$–$C_5$ alkoxy, phenoxyl, phenyl substituted $C_1$–$C_5$ alkoxyl, $C_1$–$C_5$ alkyl substituted phenoxyl, $C_1$–$C_5$ alkylthio, phenylthio, phenyl substituted $C_1$–$C_5$ alkylthio, $C_1$–$C_5$ alkyl substituted phenylthio or di($C_1$–$C_5$)-alkylamino;
   (II) heating the resulting reaction mixture at 80–130° C., and then
   (III) passing a gas containing oxygen molecules into said reaction mixture until the benzoin is substantially completely converted to the imidazole.

2. Process for preparing imidazoles which comprises:
   (I) forming a reaction mixture consisting essentially of
      (A) benzoin or benzoin substituted with one or more groups having Hammett sigma values in the —.65 to 0.4 range,
      (B) a cupric carboxylate selected from cupric acetate, cupric benzoate, cupric tallates or cupric naphthenates, said cupric carboxylate being present in an amount ranging from 0.01 to 0.2 mole per mole of component (A),
      (C) a solvent for components (A) and (B) which is selected from acetic acid and water-miscible alcohols,
      (D) ammonia or a weak acid salt of ammonia, and
      (E) benzaldehyde or benzaldehyde bearing at least one or more substituents having Hammett sigma values in the —0.65 to 0.4 range;
   (II) heating the resulting reaction mixture formed in part (I) at a temperature between about 20° C. and about 130° C., and then,
   (III) passing a gas containing oxygen molecules into the reaction mixture until imidazole formation occurs.

3. The process of claim 2 wherein the solvent (C) is acetic acid and the temperature of reaction is between about 80° C. and about 110° C.

References Cited

UNITED STATES PATENTS

| 2,658,920 | 11/1953 | Klein et al. | 260—590 |
| 3,479,185 | 11/1969 | Chambers | 260—309X |
| 2,148,920 | 2/1939 | Zerweck et al. | 260—309.2 |
| 2,377,749 | 6/1945 | Bordner | 260—590 |
| 2,744,899 | 5/1956 | Huebner | 260—309X |
| 2,883,426 | 4/1959 | Brackman | 260—596 |
| 3,287,468 | 11/1966 | Beaman et al. | 260—309 |
| 3,297,710 | 1/1967 | Silversmith | 260—309 |
| 3,299,090 | 1/1967 | Hoff et al. | 260—296X |
| 3,361,755 | 1/1968 | Green | 260—309 |

FOREIGN PATENTS

| 997,396 | 7/1965 | Great Britain | 260—309 |

DONALD G. DAUS, Primary Examiner

U.S. Cl. X.R.

260—288, 296, 309.2, 347.8, 590